United States Patent [19]
Ando et al.

[11] Patent Number: 5,600,404
[45] Date of Patent: Feb. 4, 1997

[54] CORRECTION OF MISREGISTRATION IN AN IMAGE FORMING APPARATUS DEPENDING ON MULTIPLE REGIONS OF A TRANSFER BELT

[75] Inventors: Ryo Ando; Hirotaka Mori, both of Ebina, Japan

[73] Assignee: Fuji Xerox Co., Ltd., Tokyo, Japan

[21] Appl. No.: 541,930

[22] Filed: Oct. 10, 1995

[30] Foreign Application Priority Data

Oct. 20, 1994 [JP] Japan .................................. 6-279801

[51] Int. Cl.$^6$ .................................................. G03G 15/01
[52] U.S. Cl. ................................ 399/18; 399/51; 399/300
[58] Field of Search ........................... 355/326 R, 327, 355/328, 271, 274, 203, 204, 277, 208, 275, 326 M, 326 P, 326 K

[56] References Cited

U.S. PATENT DOCUMENTS

| | | | |
|---|---|---|---|
| 4,916,547 | 4/1990 | Katsumata et al. | 358/300 |
| 4,937,664 | 6/1990 | Chiku et al. | 358/75 |
| 5,160,946 | 11/1992 | Hwang | 346/157 |
| 5,412,577 | 5/1995 | Sainio et al. | 364/469 |
| 5,452,073 | 9/1995 | Kataoka | 355/271 |

FOREIGN PATENT DOCUMENTS

63-279271  11/1988  Japan .

*Primary Examiner*—Thu A. Dang
*Attorney, Agent, or Firm*—Oliff & Berridge

[57] ABSTRACT

Specific pattern images are transferred from respective photoreceptors onto the circumferential surface of a transfer belt. By detecting the specific pattern images with sensors, misregistration amounts on a transfer belt are calculated by a misregistration correction control section. Averages of the misregistration amounts for respective colors are calculated for each region that corresponds to a single recording medium placed on the transfer belt. The scanning timings of image writing units are controlled by an image signal output control section based on the calculated averages. As a result, toner images formed on the respective photoreceptors are transferred to proper positions of any recording medium being placed on the transfer belt.

2 Claims, 5 Drawing Sheets

CORRECTION OF MISREGISTRATION IN AN IMAGE FORMING APPARATUS DEPENDING ON MULTIPLE REGIONS OF A TRANSFER BELT

BACKGROUND OF THE INVENTION

The present invention relates to a misregistration correcting method and device for correcting deviations of transfer positions of images of respective colors in an image forming apparatus which produces a multicolor image by transferring the images of the respective colors formed by a plurality of image forming sections onto a single recording medium while sequentially superimposing the images one upon another. The invention also relates to the above image forming apparatus.

Conventional electrophotographic multicolor image forming apparatuses produce a multicolor image by sequentially superimposing a plurality of toner images having different colors. For example, in one of such multicolor image forming apparatuses, a toner image of each color is transferred onto a recording sheet every time it is formed on a single photoreceptor, whereby the toner images are superimposed one upon another on the recording sheet.

To form a full-color image in this type of image forming apparatus, it is necessary to use a scanning optical system to perform image exposure of three or four colors and developing units for the respective colors, and to transfer a toner image onto a single recording sheet with a transfer unit every time it is formed. To this end, toner images of the respective colors are sequentially transferred while being superimposed one upon another by forwarding a recording sheet plural times to the location confronting the transfer unit by using a medium carrying and transporting unit that circulates while carrying the recording sheet.

To shorten the time required for multicolor image formation, there has been proposed an image forming apparatus which forms toner images of a plurality of colors by means of image forming sections, each having a scanning optical system for image exposure and a developing unit for each color. This image forming apparatus has, e.g., a transfer belt (medium carrying and transporting unit) for transporting a recording sheet while carrying it, and a plurality of photoreceptors are arranged around the transfer belt. Toner images of a plurality of colors are formed by charging units, scanning optical systems, and developing units that are arranged so as to confront the respective photoreceptors, and sequentially transferred onto a recording sheet.

In this type of image forming apparatus, toner images of different colors formed by a plurality of image forming sections need to be transferred onto a single recording sheet so as to be superimposed one upon another exactly. This is so because toner images with deviated transfer positions causes a color deviation, which greatly deteriorates the quality of a resulting full-color image.

The color deviation may be caused by errors in the locations at which a plurality of image forming sections are installed, errors in the position at which an image is written onto the photoreceptor in each image forming section, and other errors. The types of color deviations include: a transfer image deviation in the moving direction of the medium carrying and transporting unit; a transfer image deviation in the direction perpendicular to the above direction (main scanning direction); and range enlargement and reduction in the main scanning direction.

To eliminate a color deviation, there have been proposed in an image forming apparatus misregistration correcting methods for correcting transfer position deviations of toner images of different colors.

Figure 5:
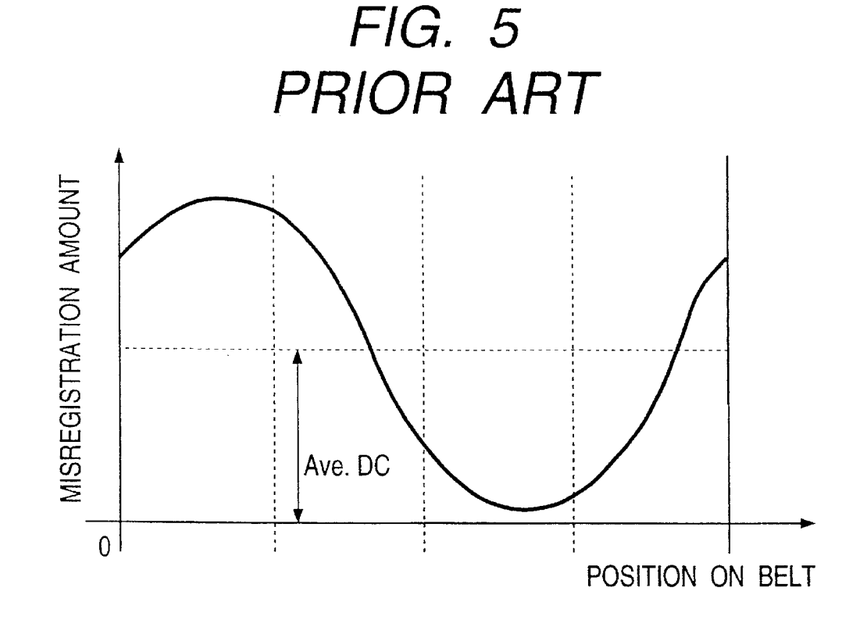
FIG. 5 shows a profile of misregistration amounts and a misregistration correcting method in a conventional image forming apparatus.

In one misregistration correcting method, misregistration amount detecting pattern images formed by the respective image forming sections are transferred onto the medium carrying and transporting unit. Deviations of the pattern images are measured at one fixed position, based on which deviations of the image writing positions are corrected. In another misregistration correcting method, misregistration amounts are measured at a plurality of positions of the circumferential surface of the medium carrying and transporting unit, and averages for one revolution is calculated as shown in FIG. 5, based on which averages the image writing positions are corrected. In these misregistration correcting methods, the transfer position of an image is corrected to an appropriate position by changing the image writing position by controlling the image light irradiating timing in the image forming section for each color based on the measured or calculated misregistration amount.

However, the aforementioned misregistration correcting methods for an image forming apparatus have the following problems.

The amounts of misregistration produced in transferring toner images formed by a plurality of image forming sections are not uniform over the circumferential surface of the medium carrying and transporting unit. For example, in the case of using the aforementioned transfer belt, the transfer belt has such a circumferential length as to allow a plurality of sheets to be placed thereon. The misregistration amount differs depending upon the location of the transfer belt at which a recording sheet to receive toner images is placed. The misregistration amount exhibits periodicity, i.e., varies with a cycle that corresponds to one revolution of the transfer belt, as shown in FIG. 5.

Thus, even if the image writing positions are corrected by forming misregistration amount detecting pattern images on the medium carrying and transporting unit and measuring actual misregistration amounts, whether misregistration can be corrected properly or not depends on the location at which a recording sheet to receive images is placed, in either of the above two methods, i.e., the method of measuring misregistration amounts at a single fixed position, and the method of measuring misregistration amounts at a plurality of positions of the circumferential surface of the medium carrying and transporting unit and calculating an average of the misregistration amounts as shown in FIG. 5. As a result, the quality of a produced image is impaired due to color deviations, making it impossible to provide high-quality images in a stable manner.

SUMMARY OF THE INVENTION

The present invention has been made in view of the aforementioned problems in the art. An object of the invention is, therefore, to provide a misregistration correcting method and device capable of always correcting misregistration precisely even for different locations at which recording sheets are carried, i.e., capable of producing excellent images free of color deviations. Another object of the invention is to provide an image forming apparatus having the above misregistration correcting device.

To achieve the above object, according to the invention, there is provided a misregistration correcting method in an image forming apparatus which has a plurality of image forming sections, and a medium carrying and transporting unit for sequentially forwarding recording media to locations opposed to the respective image forming sections while carrying the recording media, and which transfers a plurality of images formed by the respective image forming sections onto each of the recording media placed on the medium carrying and transporting unit while superimposing the images one upon another, comprising the steps of:

transferring image position detecting pattern images from the respective image forming sections onto the medium carrying and transporting unit over an entire circumferential surface thereof;

detecting the pattern images transferred on the circumferential surface of the medium carrying and transporting unit;

calculating misregistration amounts on the circumferential surface of the medium carrying and transporting unit;

calculating an average of the misregistration amounts for each of the images and for each of regions of the circumferential surface of the medium carrying and transporting unit, the regions being determined in accordance with a size of the recording media; and correcting, based on the calculated average, a transfer position of each of the images on each of the recording media placed in the respective regions of the medium carrying and transporting unit.

The image position detecting specific pattern images may consist of a pattern image for detecting deviations in the moving direction of the medium carrying and transporting unit (auxiliary scanning direction), and a pattern image for detecting deviations and range enlargement and reduction in the direction (main scanning direction) perpendicular to the moving direction. These pattern images are formed on both sides of the medium carrying and transporting unit in the main scanning direction.

Misregistration amounts may be calculated such that deviations of a transferred specific pattern image are calculated with respect to a reference that is provided on the medium carrying and transporting unit. For example, among specific pattern images of a plurality of colors, a specific pattern image of a single color is selected as the reference (i.e., a reference pattern image), and deviations of the specific pattern images of the other colors from the reference pattern image are calculated.

The region for a single sheet of recording medium in which region an average of misregistration amounts is calculated is a preset region on the circumferential surface of the medium carrying and transporting unit to carry a recording medium. The forwarding of a recording medium is controlled so as to cause the recording medium to be fed to the preset region. The region corresponding to a single sheet of recording medium can be changed properly in accordance with the size of the recording medium to be supplied.

The method of correcting the transfer positions of a plurality of images can be determined as desired. For example, the transfer positions of images on the recording medium can be corrected properly by controlling the timings at which beams of image light are applied to the respective photoreceptors.

In the misregistration correcting method in an image forming apparatus according to the invention, image position detecting specific pattern images are transferred over the entire circumferential surface of the medium carrying and transporting unit from a plurality of image forming sections, and detected by sensors. A reference is set on the circumferential surface of the medium carrying and transporting unit, and misregistration amounts at positions on the circumferential surface are calculated from the detected specific pattern images for the respective colors. Further, by presetting the locations on the circumferential surface of the medium carrying and transporting unit at which locations recording media are to be placed, averages of misregistration amounts for the respective colors are calculated for each region that corresponds to a single recording medium. Based on the averages thus calculated, the transfer positions of a plurality of images are corrected for each of recording media that are carried at the predetermined locations on the medium carrying and transporting unit. Therefore, the transfer positions can be shifted so that a plurality of images can be superimposed one upon another exactly for each recording medium. Therefore, by feeding recording media at the predetermined locations on the medium carrying and transporting unit, deteriorations in image quality such as color deviations can be prevented in any recording medium, thereby allowing stable production of high-quality images.

DESCRIPTION OF THE PREFERRED EMBODIMENT

An embodiment of the present invention will be described with reference to the drawings.

Figure 1:
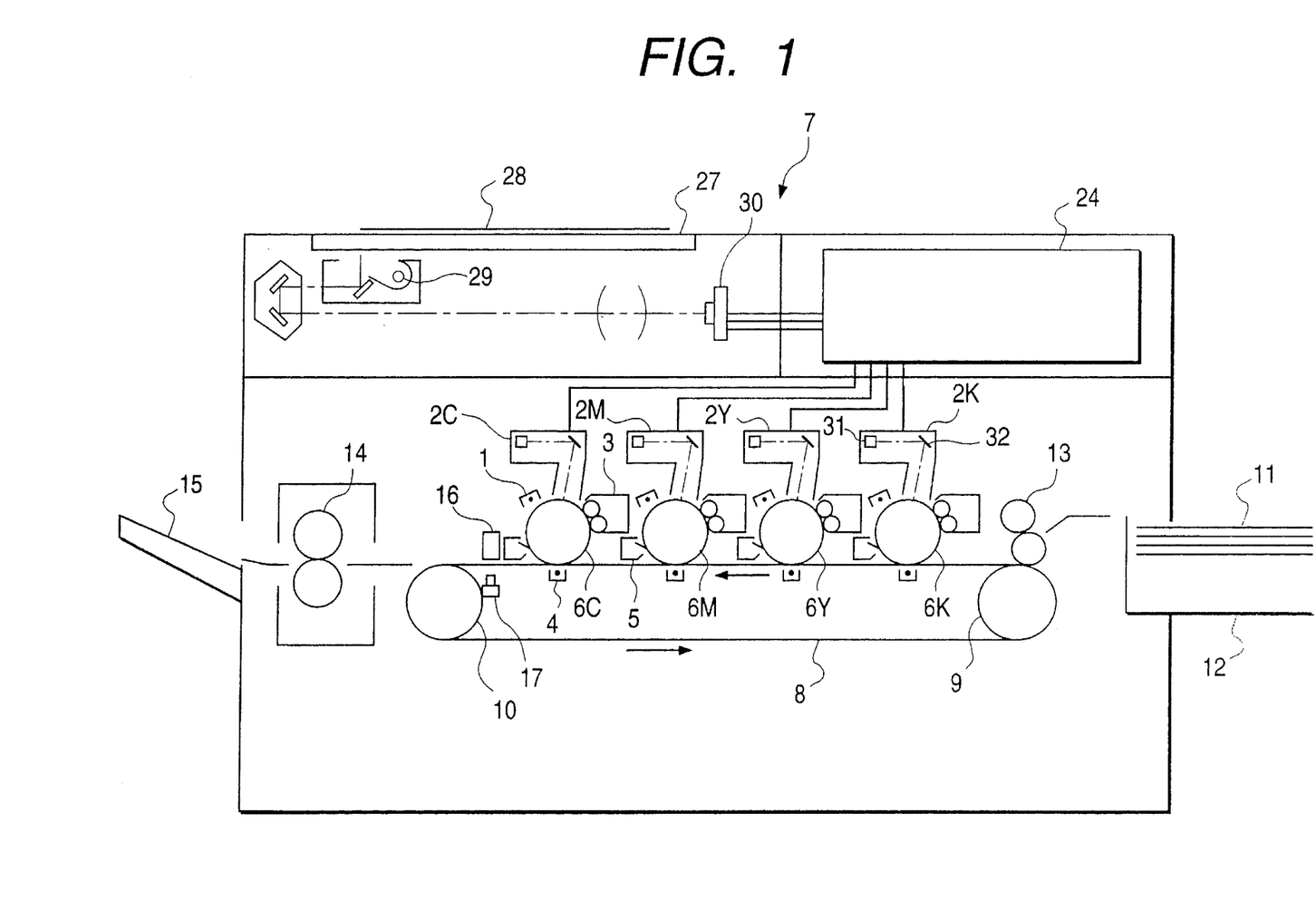
FIG. 1 schematically shows the configuration of an image forming apparatus to which a misregistration correcting method according to an embodiment of the present invention is applied.
Figure 2:
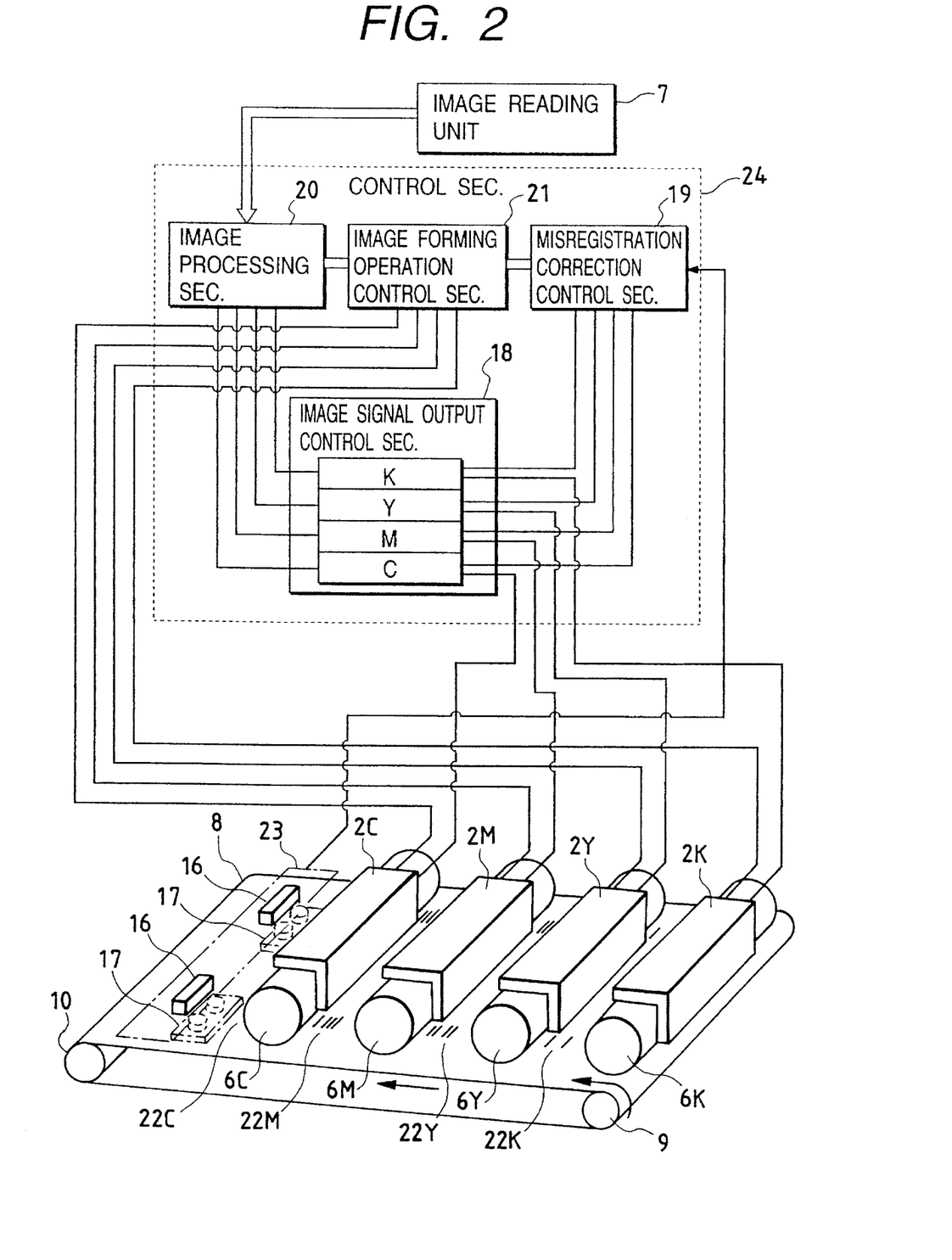
FIG. 2 is a block diagram, partially a perspective view, showing a detailed configuration for correcting misregistration in the image forming apparatus of FIG. 1.

FIG. 1 schematically shows the configuration of an image forming apparatus to which a misregistration correcting method according to an embodiment of the invention is applied. FIG. 2 is a block diagram, partially a perspective view, showing a detailed configuration for correcting misregistration in the image forming apparatus of FIG. 1.

This image forming apparatus has a transfer belt 8 and four drum-like photoreceptors 6K, 6Y, 6M and 6C that confront the transfer belt 8. The transfer belt 8 transfers a recording sheet while causing the recording sheet to stick thereto electrostatically. Around each photoreceptor 6 are a charging unit 1, an image writing unit 2, a developing unit 3, a transfer unit 4, and a cleaning unit 5. The charging unit 1 electrically charges the surface of the associated photoreceptor uniformly; the image wiring unit 2 forms a latent image by irradiating the photoreceptor with a laser beam; the developing unit 3 visualizes the latent image by applying toner to the latent image formed on the photoreceptor; the transfer unit 4 transfers a toner image formed on the photoreceptor onto a recording sheet; and the cleaning unit 5 cleans toner remaining on the photoreceptor after the toner image has been transferred.

The image forming apparatus also includes a sheet tray 12 that accommodates recording sheets 11, forward rollers 13 that feed a recording sheet 11 onto the transfer belt 8 at a predetermined timing, a fusing unit 14 that fuses toner images transferred onto a recording sheet, and a sheet discharge tray 15 that discharges a recording sheet on which an image has been formed.

The image forming apparatus further has an image reading unit 7 and a control section 24. The image reading unit 7 converts an original to an image signal by exposing and scanning it. The control section 24 controls the respective units that perform image forming operations, based on the image signal supplied from the image reading unit 7. The control section 24 includes the following components. An image processing section 20 performs digitization, gradation analysis and other operations on the image signal supplied from the image reading unit 7. Image signal output control sections 18K, 18Y, 18M and 18C control scanning of the image writing units 2 for respective colors based on the thus-processed image signal. A misregistration correction control section 19 controls the timing of laser beams for scanning through the image writing units 2, in order to correct misregistration amounts. An image forming operation control section 21 controls the operations of the respective units for image formation.

The developing units 3 use toners of different colors, i.e., black, yellow, cyan, and magenta.

As shown in FIG. 1, the image reading unit 7 includes the following components. A platen glass 27 is a plate on which an original 28 is to be placed. An exposing lamp 29 applies light to the original 28 while travelling along the platen glass 27. An image sensor 30 receives light (image light) reflected from the original 28, and converts the image light to an image signal, which is input to the control section 24.

Each image writing unit 2 has a laser beam generator 31 and a mirror 32. The laser beam generator 31 generates a laser beam based on the image signal sent from the control section 24 (image signal output control section 18). The mirror 32 reflects the laser beam to scan the circumferential surface of the photoreceptor 6 in the axial direction. With the repeated scanning with the laser beam, scanning is sequentially effected in the auxiliary scanning direction as the photoreceptor 6 rotates, so that a latent image is formed on the photoreceptor 6 in accordance with the image information.

The image processing section 20 performs digitization, shading correction, gradation correction, chromaticity adjustment, and other operations on the image signal. Having a memory, the image processing section 20 stores image signals for forming specific pattern images for image position detection. While the image signal output control sections 18K, 18Y, 18M and 18C are controlled based on the image signals for the specific pattern images, laser beams for forming the specific pattern images are applied from the image writing units 2 to the photoreceptors 6.

The transfer belt 8 is constructed such that a sheetlike member is supported by supporting bodies 9 and 10 so as to be movable endlessly. The transfer belt 8 is made of a transparent sheet. A specific pattern image for image position detection formed on each photoreceptor 6 is directly transferred onto the transfer belt 8.

Although not shown in the drawings, a sensor for detecting the transfer belt reference position is provided, and outputs a belt reference signal once every revolution of the transfer belt 8.

Figure 3:
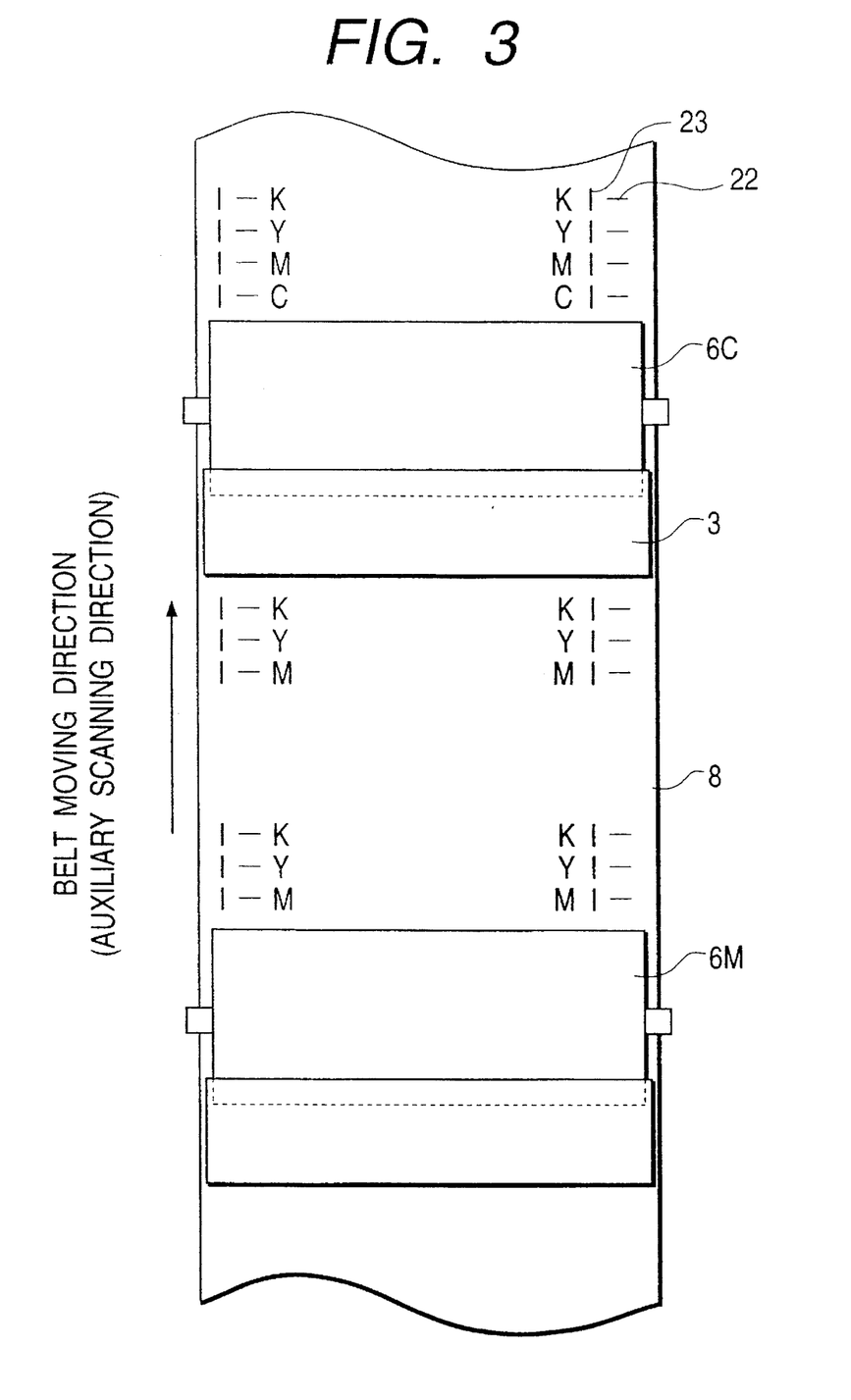
FIG. 3 shows specific pattern images for detecting misregistration amounts in the image forming apparatus of FIG. 1.

As shown in FIG. 3, the image position detecting specific pattern images to be transferred onto the transfer belt 8 consist of a specific pattern image 22 for detecting a deviation in the auxiliary scanning direction, and a specific pattern image 23 for detecting a deviation and range enlargement and reduction in the main scanning direction. These specific pattern images 22 and 23 are formed on both sides of the transfer belt 8 in the main scanning direction for each of black, yellow, magenta, and cyan.

Sensors 16 for detecting the transferred specific pattern images 22 and 23 are disposed at positions confronting the transfer belt 8. Signals from the sensors 16 are input to the misregistration correction control section 19. The sensors 16 can sense the presence or absence of the specific pattern images 22 and 23 of the respective colors transferred onto the transparent transfer belt 8 by detecting light emitted from LEDs 17.

Figure 6:
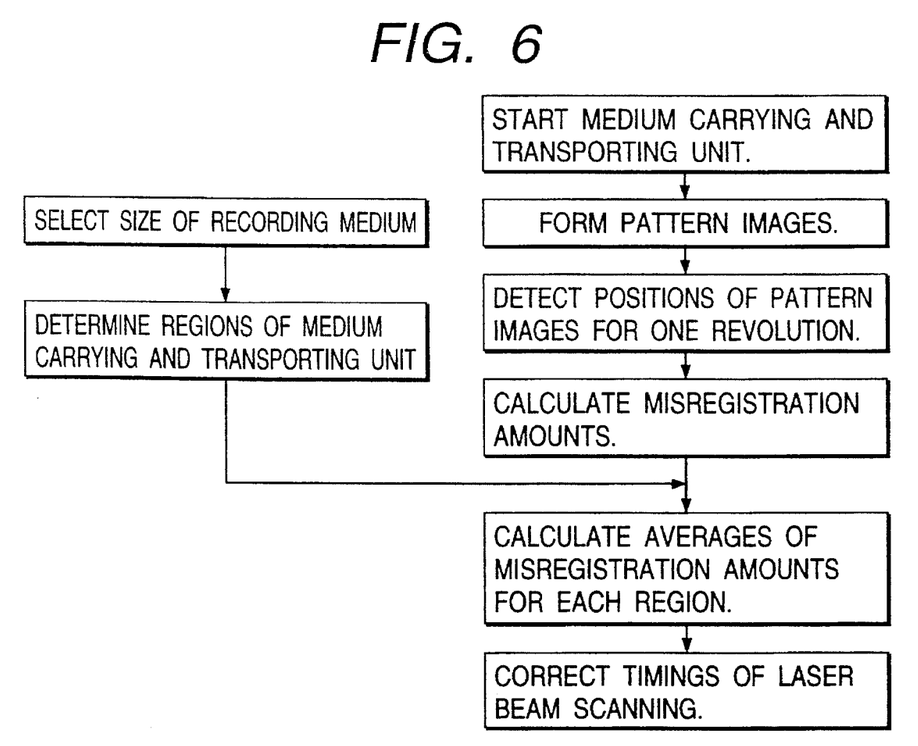
FIG. 6 is a flowchart showing the misregistration correcting procedure in the invention.

The misregistration correction control section 19 calculates misregistration amounts for the three colors other than black, i.e., deviations of the specific pattern images of those three colors from the specific pattern images (references) 22K and 23K of black. The misregistration correction control section 19 also calculates correction values of the laser beam irradiation timings based on the calculated misregistration amounts. Recording sheets 11 are fed onto the transfer belt 8 at predetermined timings by the sheet forward rollers 13, and are carried at predetermined locations on the circumferential surface of the transfer belt 8 based on the belt reference signal as shown in part (b) of FIG. 4. As shown in part (a) of FIG. 4, the misregistration correction control section 19 calculates an average of the above-calculated misregistration amounts for each of regions A, B, C and D, each region corresponding to a single recording sheet 11 placed on the transfer belt 8. Further, based on the calculated averages, the misregistration correction control section 19 supplies correction signals to the image signal output control section 18. FIG. 6 is a flowchart showing the above misregistration correcting procedure.

Upon reception of an image signal from the image processing section 20, the image signal output control section 18 controls the light beam scanning operations and the scanning timings of the image writing units 2 based on the image signal. When a correction signal is received from the misregistration correction control section 19, the image writing unit 2 for each color outputs a laser beam scanning signal while shifting the scanning timing, so as to correct the position on a recording sheet 11 at which a toner image is transferred. More specifically, the laser beam scanning timings of the image writing units 2K, 2Y, 2M and 2C are controlled so that a black toner image from the first photoreceptor 6K, a yellow toner image from the second photoreceptor 6Y, a magenta toner image from the third photoreceptor 6M, and a cyan toner image from the fourth photoreceptor 6C are sequentially transferred onto a recording sheet 11 at the same position as the recording sheet 11 is transported in the direction indicated by arrows in FIG. 1.

Having a memory, the misregistration correction control section 19 stores the correction values for shifting the laser beam scanning timings at the end of the image position detecting operation. In the image forming process, the laser beam scanning is performed based on the correction values.

The misregistration correcting operation in the above image forming apparatus will be described below.

When the misregistration correcting operation of the image forming apparatus is started, the signals for forming the image position detecting specific pattern images are supplied from the memory of the image processing section 20 to the image signal output control sections 18K, 18Y, 18M and 18C for the respective colors. The image signal output control sections 18K, 18Y, 18M and 18C control the outputting of laser beams by the image writing units 2K, 2Y, 2M and 2C based on the received signals. Thus, the writing units 2K, 2Y, 2M and 2C apply laser beams for forming the specific pattern images to the photoreceptors 6K, 6Y, 6M and 6C.

On the other hand, upon reception of a signal for starting the misregistration correcting operation, the image forming operation control section 21 activates the photoreceptors 6, the transfer belt 8, the charging units 1, the developing units 3, and other units, so that the surfaces of the photoreceptors 6K, 6Y, 6M and 6C are charged uniformly by the respective charting units 1. Thereafter, laser beams for forming the specific pattern images are emitted from the image writing units 2K, 2Y, 2M and 2C, to form latent images on the respective photoreceptors 6K, 6Y, 6M and 6C. These latent images are developed into toner images by the respective developing units 3, and then sequentially transferred onto the circulating transfer belt 8 by the respective transfer units 4. As a result, the specific pattern images 22 and 23 for the respective colors as shown in FIG. 3 are formed over the entire circumferential surface of the transfer belt 8.

The transferred specific pattern images 22 and 23 are sensed by the sensors 16, and deviations, i.e., misregistration amounts of the specific pattern images of the three colors other than block are calculated with respect to deviations of the specific pattern images 22K and 23K of black by the misregistration correction control section 19. As shown in part (a) of FIG. 4, the misregistration amounts assume a curve having a period that corresponds to one revolution of the circulating transfer belt 8.

Figure 4A:
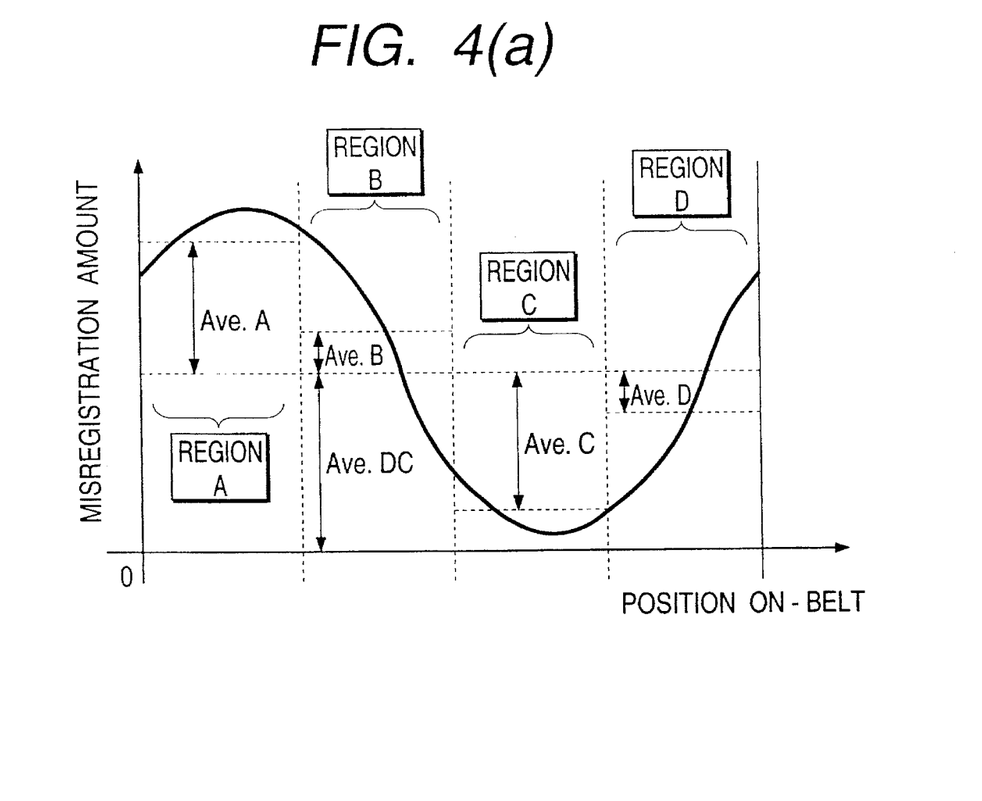
FIG. 4 illustrates a misregistration correcting method according to the invention.
Figure 4B:
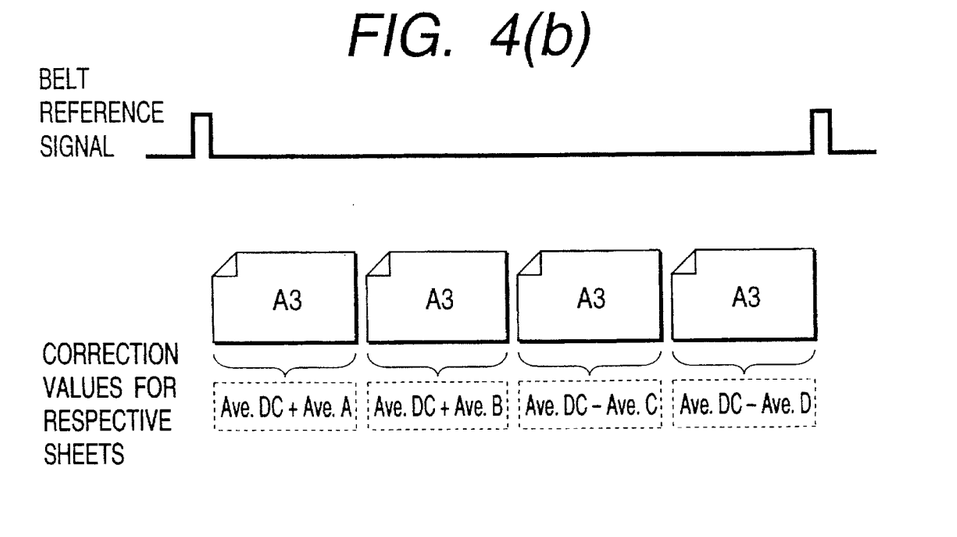

In the image forming process, as shown in part (b) of FIG. 4, recording sheets 11 are carried at predetermined locations on the circumferential surface of the transfer belt 8 based on the belt reference signal. When the misregistration amounts for the respective colors have been calculated, averages of the misregistration amounts for the respective colors are calculated for respective regions A, B, C and D as shown in part (a) of FIG. 4, each of the regions corresponding to a single recording sheet.

Based on the averages thus calculated, the misregistration correction control section 19 corrects the timing of exposure with the laser beams. Thus, the transfer positions of images of the three colors other than black (reference color) are corrected for each of the recording sheets 11 being carried at the respective locations on the transfer belt 8. That is, the averages are input to the image signal output control section 18 from the misregistration correction control section 19, and the scanning timing of each image writing unit 2 is controlled so as to shift the transfer position of each toner image on the transfer belt 8 by the average in a proper direction. As a result, in the image forming process, the transfer positions of toner images of the respective colors are corrected so that a black toner image from the photoreceptor 6K, a yellow toner image from the photoreceptor 6Y, a magenta toner image from the photoreceptor 6M, and cyan toner image from the photoreceptor 6C are sequentially transferred onto a recording sheet 11 at the same position as it is transported by the transfer belt 8.

Since the laser beam scanning timing of the image writing unit 2 is controlled by using appropriate correction values for each location on the circumferential surface of the transfer belt 8 as described above, toner images of the respective colors can be transferred so as to be exactly superimposed one upon another onto a recording sheet 11 placed at any location on the transfer belt 8. As a result, a high-quality image free of color deviations can be obtained stably.

Although the aforementioned image forming apparatus is of a type in which image information is read by the image reading unit 7 by exposing and scanning an original 28 on the platen glass 17, the misregistration correcting method and device of the invention can also be applied to an image forming apparatus of a type in which an image signal is directly input to the image processing section from an external unit such as a computer.

As described in the foregoing, in the misregistration correcting method for an image forming apparatus according to the invention, the transfer positions of a plurality of images are corrected by calculating averages of misregistration amounts for the respective colors for each region that corresponds to a single recording medium being placed on the circumferential surface of the recording medium carrying and transporting unit. Therefore, the transfer positions of a plurality of images can be superimposed one upon another exactly for each of recording media being placed at the respective locations. As a result, deteriorations in image quality such as color deviations can be prevented in any recording medium placed on the circumferential surface of the recording medium carrying and transporting unit, thereby allowing stable production of high-quality images.

What is claimed is:

1. A misregistration correcting method in an image forming apparatus which has a plurality of image forming sections, and a medium carrying and transporting unit for sequentially forwarding recording media to locations opposed to the respective image forming sections while carrying the recording media, and which transfers a plurality of images formed by the respective image forming sections onto each of the recording media placed on the medium carrying and transporting unit while superimposing the images one upon another, comprising the steps of:

transferring image position detecting pattern images from the respective image forming sections onto the medium carrying and transporting unit over an entire circumferential surface thereof;

detecting the pattern images transferred on the circumferential surface of the medium carrying and transporting unit;

calculating misregistration amounts on the circumferential surface of the medium carrying and transporting unit;

calculating an average of the misregistration amounts for each of the pattern images and calculating an average of the misregistration amounts for each of the pattern images within a region for each of a plurality of regions of the circumferential surface of the medium carrying and transporting unit, the respective regions being determined in accordance with a size of the recording media; and correcting, based on the calculated averages, a transfer position of each of the images on each of the recording media placed in the respective regions of the medium carrying and transporting unit.

2. Am image forming apparatus comprising:

a plurality of image forming sections;

a medium carrying and transporting unit for sequentially forwarding recording media to locations opposed to the respective image forming sections while carrying the recording media;

means for transferring a plurality of images formed by the respective image forming sections onto each of the recording media placed on the medium carrying and transporting unit while superimposing the images one upon another, and for transferring image position detecting pattern images from the respective image forming sections onto the medium carrying and transporting unit over an entire circumferential surface thereof;

means for detecting the pattern images transferred on the circumferential surface of the medium carrying and transporting unit;

means for calculating misregistration amounts on the circumferential surface of the medium carrying and transporting unit;

means for calculating an average of the misregistration amounts for each of the pattern images and calculating an average of the misregistration amounts for each of the pattern images within a region for each of a plurality of regions of the circumferential surface of the medium carrying and transporting unit, the respective regions being determined in accordance with a size of the recording media; and means for correcting, based on the calculated averages, a transfer position of each of the images on each of the recording media placed in the respective regions of the medium carrying and transporting unit.

* * * * *